(No Model.) 2 Sheets—Sheet 1.
A. GORD.
BRICK MACHINERY.
No. 589,892. Patented Sept. 14, 1897.
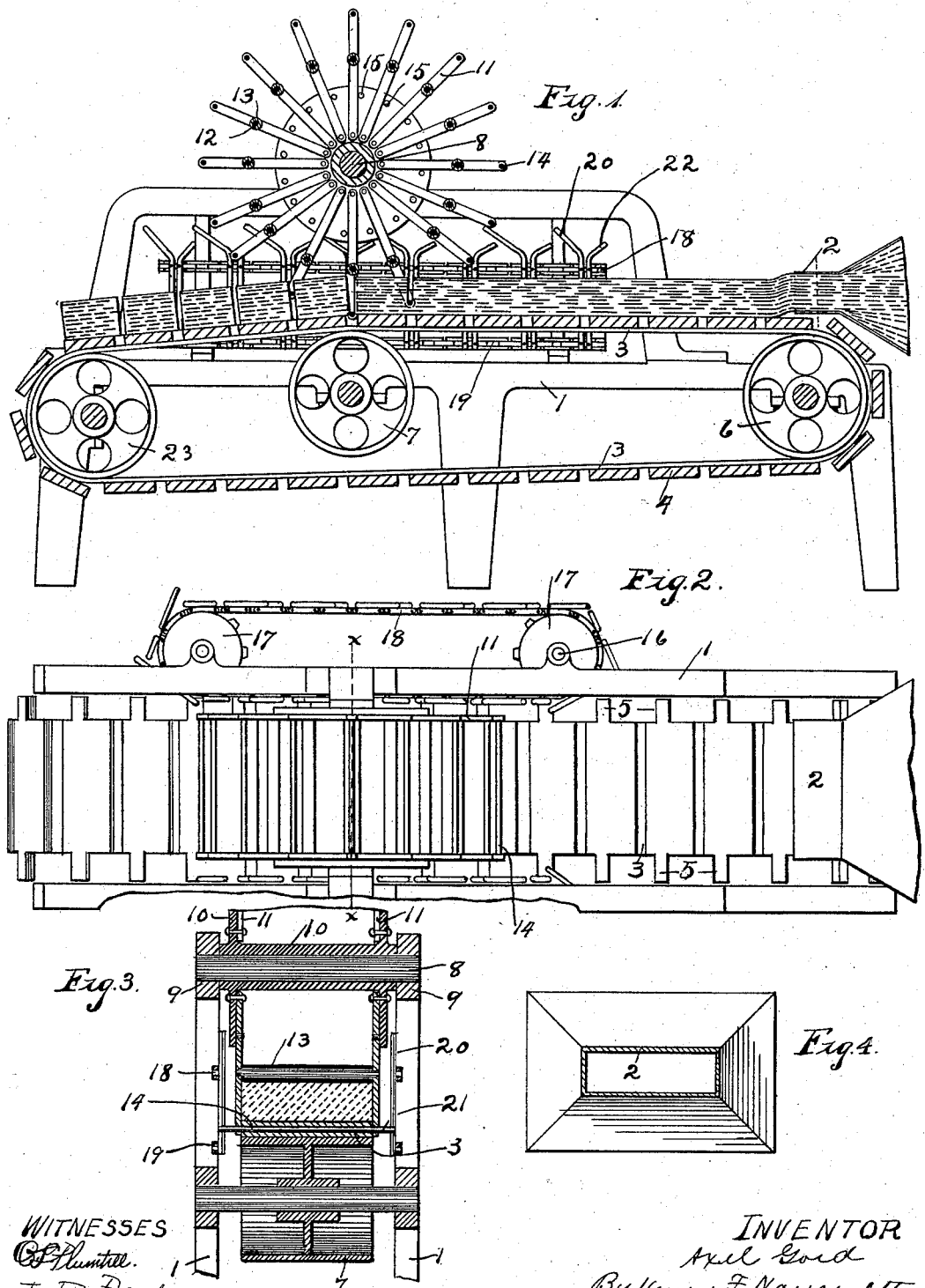

(No Model.) 2 Sheets—Sheet 2.
A. GORD.
BRICK MACHINERY.
No. 589,892. Patented Sept. 14, 1897.
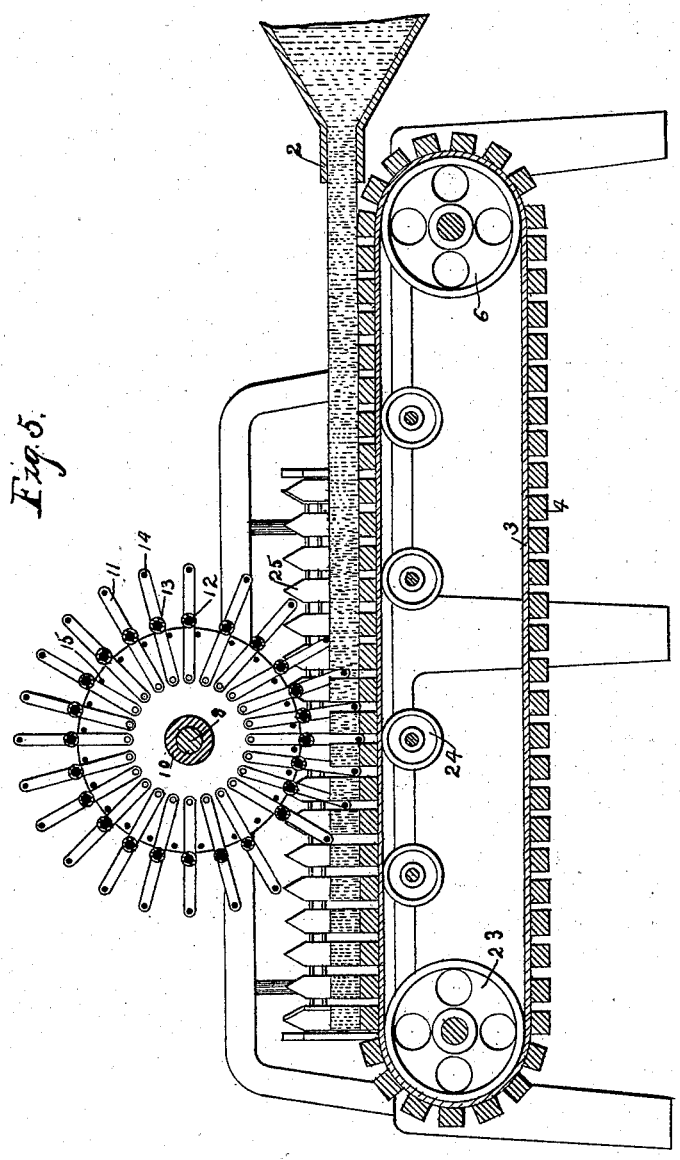
Witnesses:
O. L. Plumtree
F. D. Ansley
Inventor:
Axel Gord
By,
Henry F. Noyes
Atty.

UNITED STATES PATENT OFFICE.

AXEL GORD, OF GRANT PARK, ILLINOIS.

BRICK MACHINERY.

SPECIFICATION forming part of Letters Patent No. 589,892, dated September 14, 1897.

Application filed May 7, 1896. Serial No. 590,581. (No model.)

*To all whom it may concern:*

Be it known that I, AXEL GORD, of Grant Park, Kankakee county, Illinois, have invented certain new and useful Improvements in Brick Machinery, of which the following is a full and complete specification.

This invention relates to brick machinery, and has for its object the production of an economical machine which shall take the clay while yet in a plastic condition and cut it into blocks similar in form to that required of the finished brick. The machine which I have invented to accomplish this object is clearly illustrated in the accompanying drawings, in which—

Figure 1 is a longitudinal sectional elevation of my invention. Fig. 2 is a plan of the same. Fig. 3 is a section taken on line $x$ $x$ of Fig. 2. Fig. 4 is an end view of the forming funnel or mold, and Fig. 5 is a slight modification of my invention.

Referring to the drawings, I provide a suitable frame 1. At one end of this frame is a funnel-shaped mold 2, the form of which is more clearly shown in Fig. 4. The plastic clay is pushed through this mold and onto the belt 3, on which it forms a long bar of a cross-section having dimensions the same as two of those desired for the finished brick. To push this clay through the mold, various ways are in use, any of them suitable, though the most common is a spiral conveyer. The belt 3 has suitably fastened to its surface and at a certain distance apart the blocks 4 of a width to suit the length of the desired brick and having on each end a small projection 5, extending beyond the outer edges of the belt, and the object of which will be referred to later on.

To guide the belt, I provide suitable pulleys 6 and 23, having a bearing at each end of the frame, and a third pulley 7, situated at such a height that the direction of the belt in passing over it from the pulley 6 to the other pulley 23 is changed somewhat. Vertically above the pulley 7 I provide a shaft 8, supported in suitable brackets 9. On this shaft are two hubs 10, and to these hubs are pivoted the arms 11. Each pair of these arms is connected by a rod 12 and distance-piece 13, and at their ends are provided with a wire 14. Each arm has a certain amount of play upon its pivot between the pins 15, the object of which will be referred to later on. The pins 15 are firmly fastened to the hubs 10.

On each side of the arms 11 are the projections 21. On each side of the frame and supported by it and the brackets 9 are the vertical shafts 16, each carrying two sprocket-wheels 17, there being a pair of these vertical shafts on each side of the frame. Each pair of upper sprocket-wheels are connected by a link belt 18 and each pair of lower sprocket-wheels by a belt 19, and these belts are connected by a number of rods 20 and 22, placed a certain distance apart. The upper and lower sprocket-wheels are placed at such a distance apart that the rods 22, near their lower ends, may be contacted by the projections 5. Each pair of rods 20 and 22 are placed a slight distance apart, that they may receive between them the projections 21, and are bent away from each other at their upper ends, that these projections may the more readily drop between them.

In the operation of the machine the clay, while yet in a plastic condition, is pushed through the mouth of the form upon the belt and has enough body or stiffness so that as it issues from the mouth it pushes the belt along with it. Motion of the belt is transmitted by the projections 5 to the rods 22 and sprocket-wheels 17, and as there are always some of the projections 21 between a pair of rods 20 and 22 this motion is transmitted by the arms 11 through the pins 15 to the hubs 10.

As the clay comes beneath one of the wires 14 the latter in its revolution is forced through the clay, making a transverse cut clear through the clay. As each set of rods 20 and 22 is at an equal distance from the next set, as the next wire 14 comes around these rods guide it to cut off another block of clay of the same dimensions as the first and these operations take place as long as the clay is forced upon the belt. The deepest cut is made when the wire is directly over the pulley 7, and at this point, as the belt changes its direction, the thin web still remaining uncut is broken.

It will be seen that the object of the play allowed the arms 11 upon their pivots is to allow the guide-rods 20 and 22 to keep the wires 14 always the same horizontal distance apart when they are cutting.

In Fig. 5 I have shown a slight modification of my invention adapted to make the cut the narrowest way of the brick. As in this case the cut is deeper than that shown in the previous construction, it is necessary that the belt 3 should be horizontal until the wire has left the clay after making the cut; otherwise it would clip off the corner of the block of clay. I have therefore shown rollers 24 all of the same height and adapted to support the belt in a horizontal line from the pulley 6 to the pulley 23, and in place of the guides 20 and 22 I have shown a single guide 25 of a width equal to the distance required to be between the cuts.

While I have described my invention with more or less completeness as regards the details thereof, I do not desire to be limited thereto unduly, as I contemplate all proper changes in form, omission of parts, and the substitution of equivalents, as circumstances may suggest or necessity render equivalent.

I claim—

In a brick-machine, the combination of an endless belt supported on suitable pulleys, a pair of link belts suitably supported, a number of pairs of vertical rods each pair fastened at each end to said link belts, one of each pair of rods adapted to be driven by said endless belt, a shaft provided with suitable hubs, a number of arms pivoted in pairs to said hubs, each pair of arms joined near their ends by a wire, and provided with projections which are adapted to be received between said pairs of vertical rods, and a means of limiting the oscillating movement of said pivoted arms, as and for the purpose set forth.

AXEL GORD.

Witnesses:
HENRY F. NOYES,
O. L. PLUMTREE.